United States Patent [19]
McCabe

[11] Patent Number: 4,966,195
[45] Date of Patent: Oct. 30, 1990

[54] TRANSMISSION PRESSURE REGULATOR

[75] Inventor: Ralph P. McCabe, Troy, Mich.

[73] Assignee: Colt Industries Inc., New York, N.Y.

[21] Appl. No.: 339,884

[22] Filed: Apr. 17, 1989

Related U.S. Application Data

[63] Continuation of Ser. No. 66,693, Jun. 25, 1987, abandoned.

[51] Int. Cl.$^5$ .................. F16K 31/06; F16K 31/40
[52] U.S. Cl. ..................... 137/625.61; 137/625.64; 251/129.08; 251/30.01
[58] Field of Search .............. 137/625.64, 625.61; 251/129.08, 30.01

[56] References Cited

U.S. PATENT DOCUMENTS

| | | | |
|---|---|---|---|
| 2,896,588 | 7/1959 | Hayner et al. | 137/625.61 |
| 3,349,801 | 10/1967 | Grundmann | 137/625.61 X |
| 3,430,656 | 3/1969 | Hawk | 137/625.61 |
| 3,789,735 | 2/1974 | Tam et al. | 137/625.61 X |
| 4,538,643 | 9/1985 | Goedecke et al. | 137/625.64 |
| 4,674,613 | 6/1987 | Sikorski | 137/625.64 X |

FOREIGN PATENT DOCUMENTS 1100189  3/1955  France ..................... 137/625.61

Primary Examiner—Arnold Rosenthal
Attorney, Agent, or Firm—Walter Potoroka, Sr.

[57] ABSTRACT

A pressure regulating device regulates the pressure of a flowing medium and includes a stationary member. A movable armature is disposed axially from the stationary member for moving axially in relation to the stationary member. A coil is disposed about the stationary member and the armature and through which current flows for generating magnetic flux to create an attractive force to move the armature in relation to the stationary member. A housing is disposed about the coil and the stationary member and the armature for encasing the armature and the coil and the stationary member. At least one aperture is formed in the housing to allow a fluid medium to enter and exit the housing and to contact the armature. A flow valve is spaced axially from one end of the armature for moving independently of the armature to prevent parasitic forces from being transmitted by the flow valve to the armature.

44 Claims, 2 Drawing Sheets

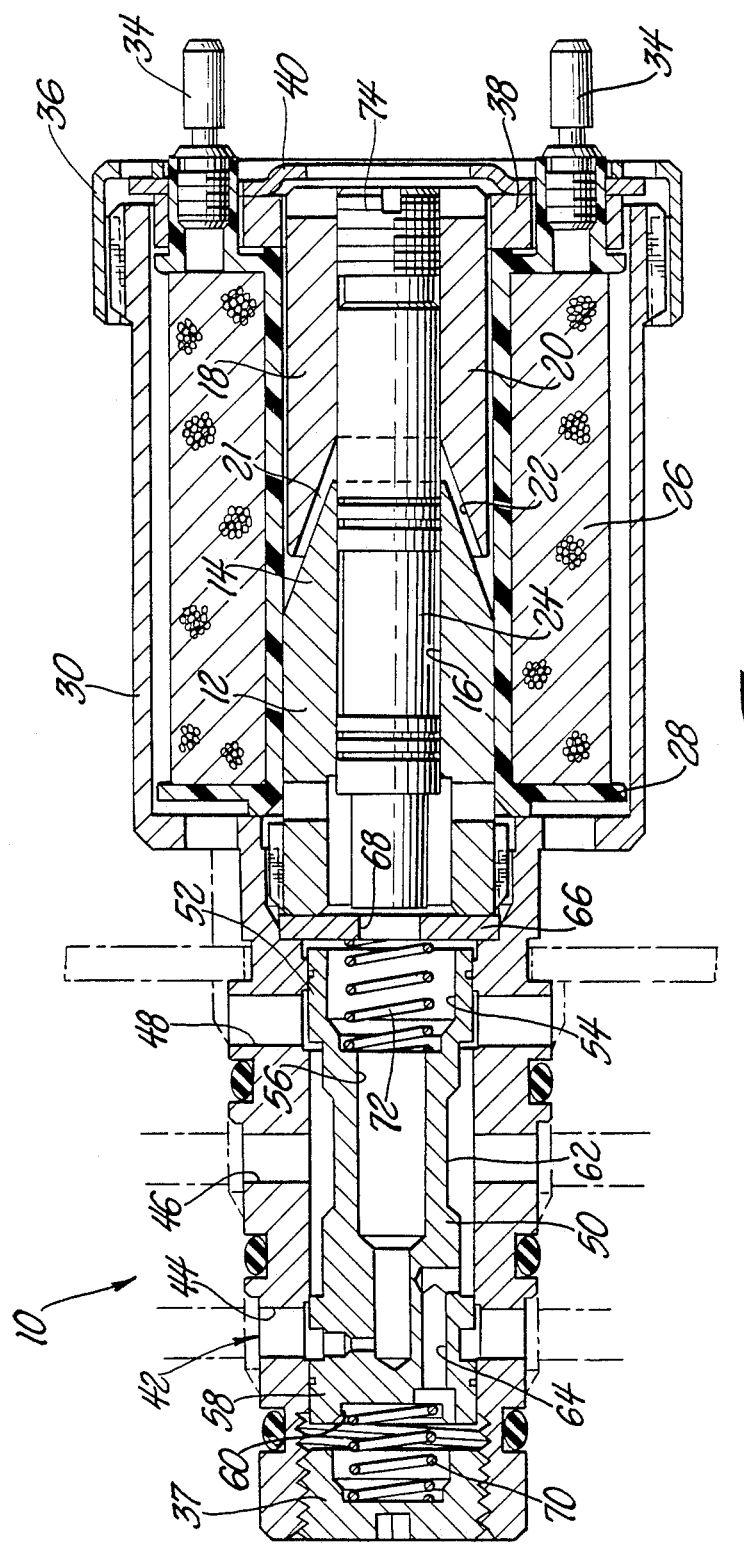

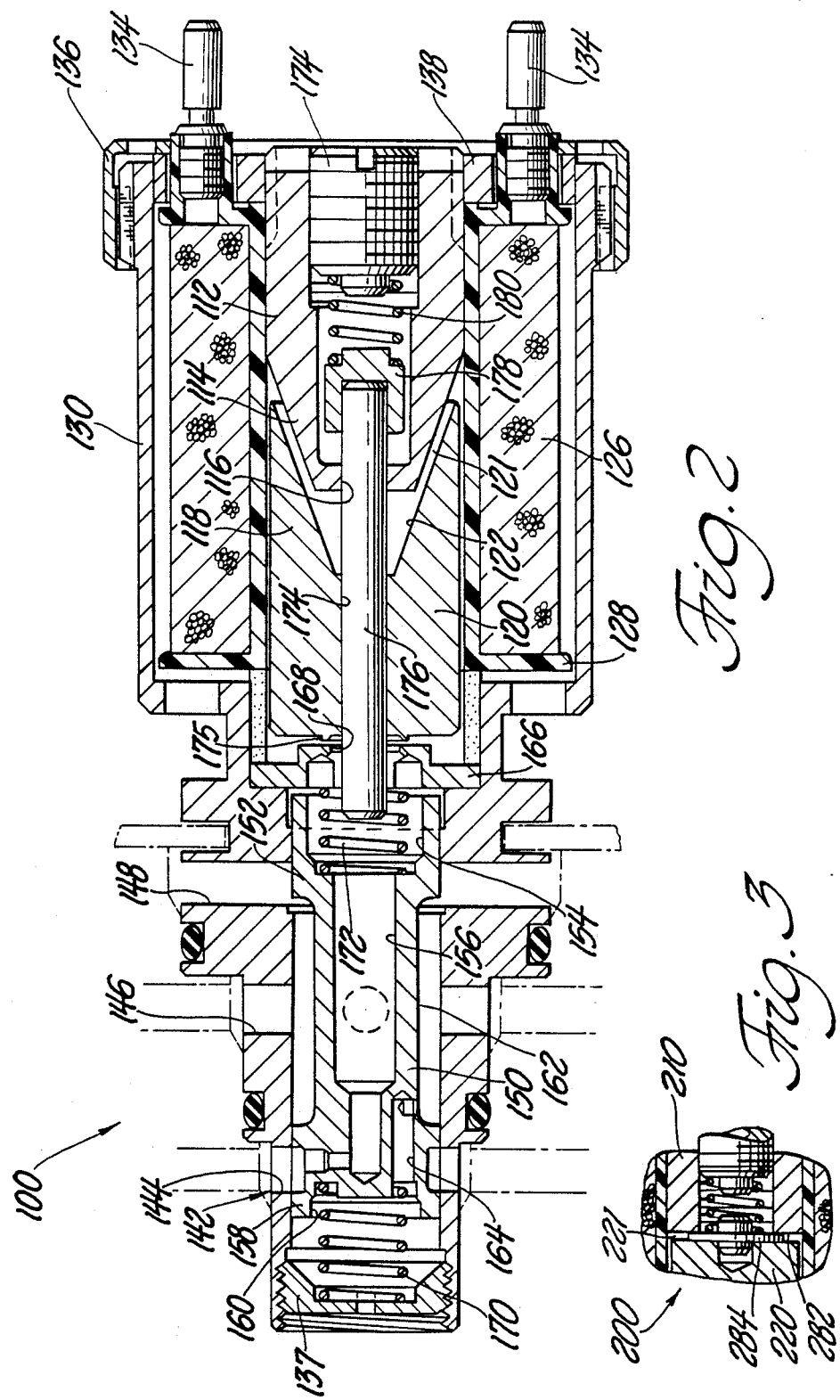

TRANSMISSION PRESSURE REGULATOR

This is a continuation Application of Ser. No. 066,693 filed June 25, 1987, abandoned.

TECHNICAL FIELD

The subject invention relates to a pressure control device for controlling the pressure and volume of a fluid medium, for example in a control system of an automatic transmission of a motor vehicle.

BACKGROUND ART

A pressure control device for use in a control system of an automatic transmission of a motor vehicle has been used in the past. A typical pressure control device is shown in U.S. Pat. No. 4,579,145, issued Apr. 1, 1986, in the name of Leiber et al. This patent discloses a pressure control device including a housing which encases a magnetic coil and an armature. A control slide is actuated by the armature and movable within a valve through which a pressure medium to be controlled passes. A plunger is carried by the armature. A pin loaded with control pressure is arranged at the end of the control slide opposite to that facing the plunger and acts on the control slide.

The problem with the above device is that low magnetic forces are required to move the spool valve, resulting in poor response and potential fouling. Further, the spool valve is dependent upon the position of the solenoid armature. This requires the hydraulic flow forces to enter into the armature force balance and allows parasitic forces to be transmitted by the spool valve to the armature which has a large effect on the regulation of the device. Also, there is poor manufacturability because of the need to maintain a precise position between the armature, spool valve and its ports.

STATEMENT OF THE INVENTION AND ADVANTAGES

A pressure regulating device regulates the pressure of a flowing medium and includes a stationary member. A movable armature means is disposed axially from the stationary member for moving axially in relation to the stationary member. A coil means is disposed about the stationary member and the armature means and through which current flows for generating magnetic flux to create an attractive force to move the armature means in relation to the stationary member. A housing means is disposed about the coil means, stationary member and armature means for encasing the armature means, coil means and stationary member. An aperture means forms at least one aperture in the housing means to allow a fluid medium to enter and exit the housing means and to contact the armature means. A flow valve means is spaced axially from one end of the armature means for moving independently of the armature means to prevent parasitic forces from being transmitted by the flow valve means to the armature means.

Accordingly, the subject invention includes a spool valve which is independent of the position of the solenoid armature. Hence, large hydraulic forces are available to move the spool valve instead of low magnetic forces, improving response and overcoming potential fouling. Also, large flows can be accommodated without the pressure variation due to changes in armature position. Further, the manufacturability is improved because there is no need to maintain a precise position between the armature, spool valve and its ports. Finally, hydraulic flow forces do not enter into the armature force balance and, therefore, do not have a large effect on the regulation of the device.

FIGURES IN THE DRAWINGS

Other advantages of the present invention will be readily appreciated as the same becomes better understood by reference to the following detailed description when considered in connection with the accompanying drawings wherein:

FIG. 1 is a cross sectional elevational view of a preferred embodiment of the subject invention;

FIG. 2 is a cross sectional elevational view of an alternate embodiment of the subject invention; and FIG. 3 is a partial fragmentary view of an alternate embodiment of the stationary and armature members of the subject invention.

DESCRIPTION OF THE PREFERRED EMBODIMENT

A pressure regulating device for regulating the pressure of a flowing fluid medium is generally shown at 10 in FIG. 1. The device 10 includes a stationary pole piece of member 12. The stationary member 12 has one end 14 which is tapered to form a frustoconical configuration. The stationary member 12 also includes a central passageway 16 communicating axially therethrough.

The device 10 also includes a movable armature means 18 disposed axially from the stationary member 12 for moving axially in relation to the stationary member 12. The armature means 18 comprises an armature ring 20 spaced axially from and circumferentially about the tapered end 14 of the stationary member 12. This creates a working gap 21 between the armature ring 18 and the tapered end 14 of the stationary member 12. Stated another way, the stationary member 12 has a tapered end 14 acting as a male member and the armature ring 18 as a complimentary female or cavity portion 22 which is spaced axially from the tapered end 14 of the stationary member 12 to define a working gap 21 therebetween. The working gap 21 defines the distance the armature means 18 moves in relation to the stationary member 12. The armature means 18 also includes an armature shaft 24 extending axially outwardly from the armature ring 20 and slidably disposed in the central passage 16 of the stationary member 12.

The device 10 further includes a coil means 26 disposed about the stationary member 12 and the armature means 18 and through which an electrical current flows for generating magnetic flux to create an attractive force to move the armature means 18 in relation to the stationary member 12. The coil means 26 comprises a solenoid coil 26. The current flowing through the solenoid coil 26 may be DC or the average value resulting from a chopped or pulse width modulated electrical supply. The attractive force is proportional to the current and the number of turns of wire on the solenoid coil 26. The attractive force is also inversely proportional to the square of the distance 21 between armature ring 20 and the tapered end 14 of the stationary member 12. An annular u-shaped bracket member 28 is disposed about the stationary member 12 and armature ring 20. The solenoid coil 26 is disposed within the u-shaped bracket member 28.

The device 10 includes a housing means 30 disposed about the coil means 26 and stationary member 12 and the armature means 18 for encasing the armature means 18 and the coil means 26 and the stationary member 12. The housing means 30 comprises an annular casing 30 about the device 10 to prevent contaminants from entering the device 10. A pair of connectors 34 is disposed in the casing 30 and the U-shaped bracket member 28 and connected to the solenoid coil 26 for attachment to an electrical supply source to allow electrical current to flow to the solenoid coil 26. The housing means 30 also includes an annular cap member 36 disposed about one end of the casing 30 to prevent contaminants from entering the solenoid coil 26 and the stationary member 12 and the armature means 18. A return member 38 is disposed about one end of the armature ring 20 and abuts one end of the U-shaped bracket member 28. A spacer 40 is disposed between the return member 38 and the cap member 36. The return member 38 creates a closed flux loop by allowing magnetic flux to flow from the solenoid coil 26 to the stationary member 12 and across the working gap 21 to the armature ring 20 and through the return member 38 and bracket member 28 to the solenoid coil 26.

The device 10 further includes an aperture means, generally indicated at 42, forming at least one aperture in the housing means 30 to allow a fluid medium to enter and exit the housing means 30 and to contact the armature means 18. The aperture means 42 comprises a first aperture 44 formed in the housing means 30 to allow the fluid medium to enter and exit the housing means 30. The aperture means 42 further comprises a second aperture 46 spaced axially from the first aperture 44 and formed in the housing means 30 to allow the fluid medium to enter and exit the housing means 30. The aperture means 42 further comprises a third aperture 48 spaced axiially from the first 44 and second 46 apertures to allow the fluid medium to enter and exit the housing means 30. The second aperture 46 is disposed axially between the first aperture 44 and the third aperture 48.

The device 10 further includes a flow valve means 50 spaced axially from one end of the armature means 18 for moving independently of the armature means 18 to prevent parasitic forces from being transmitted by the flow valve means 50 to the armature means 18. The flow valve means 50 comprises a spool valve 50 having a first end 52 spaced axially from one end of the stationary member 12. The first end 52 of the spool valve 50 includes a first cavity 54 formed therein. The spool valve 50 also includes a first internal passage 56 communicating with the first aperture 44 of the housing means 30 and the cavity portion 54 of the first end 52 to allow the fluid medium to flow from the first aperture 44 to the cavity portion 54 of the first end 52 of the spool valve 50. The spool valve 50 also includes a second end 58 axially opposite the first end 52 and having a second cavity 60 formed therein. The spool valve 50 also includes an annular recessed portion 62 about the circumference thereof between the first end 52 and the second end 58 thereof. The spool valve 50 further includes a second internal passage 64 communicating with the recessed portion 62 and second cavity 60 to allow the fluid medium to flow from either of the first aperture 44 and the second aperture 46 and the third aperture 48 to the second cavity 60 of the spool valve 50.

The device 10 includes a poppet valve means 66 disposed axially between the flow valve means 50 and the armature means 18 for creating a restriction of fluid flow to the armature means 18. The poppet valve means 66 comprises a poppet plate 66 having a poppet aperture 68 disposed therein through which the fluid medium flows.

The housing means 30 further includes an end cap 37 threadably engageable with and disposed in the other end of the housing means 30. The end cap 37 may be used to set the control pressure for a given current.

The device 10 includes a first biasing means 70 for continuously biasing the flow valve means 50 toward the poppet valve means 66. The first biasing means 70 comprises a spring 70 disposed within the second cavity 60 and between the second end cap 37 and the second end 58 of the spool valve 50. The device 10 also includes a second biasing means 72 disposed between the poppet valve means 66 and the flow valve means 50 for biasing the flow valve means 50 axially away from the armature means 18 to reduce oscillations between the armature means 18 and the flow valve means 50. The second biasing means 72 comprises a spring 72 disposed within the first cavity 54 and between the first end 52 of the spool valve 50 and the poppet plate 66. The second biasing means 72 has a preload less than the first biasing means 70.

The device 10 includes an adjustment means 74 disposed axially at one end of the armature means 18 for controlling the axial location of the armature means 18 to the axial location of the face of the poppet plate 66. The adjustment means 74 comprises a threaded fastener 74 threadably engageable with the armature ring 20 and the armature shaft 24 at one end thereof.

In operation, the device 10 controls pressure in response to an electrical current by bypassing flow from a pump back to its inlet. The device 10 receives electrical current from a power source through the connectors 34 to the solenoid coil 26. The solenoid coil 26 generates magnetic flux to create an attractive force between the armature means 18 and the stationary member 12. The armature means 18 moves toward the stationary member 12 and the shaft 24 of the armature means 18 closes the poppet aperture 68, building up pressure on the first end 52 of the spool valve 50 to move the spool valve 50 axially away from the poppet valve 66 to open the flow path from the first aperture 44, receiving supply pressure, to the second aperture 46, receiving control pressure, and closing the flow path from the second aperture 46 to the third aperture 48, receiving sump pressure. The second internal passage 64 allows the control pressure to be applied at the second end 58 of the spool valve 50. The control pressure will increase at the second end 58 of the spool valve 50 to move the spool valve 50 axially toward the poppet plate 66 and allow supply pressure to enter the first aperture 44 and flow through the first internal passage 56 to build up pressure at the first end 52 of the spool valve 50. The spool valve 50 will move axially in relation to the poppet plate 66 until the sum of the forces on the spool valve 50 are in equilibrium.

Furthermore, the first biasing means 70 applies a force to bias the spool valve 50 toward the poppet plate 66 such that a predetermined amount of current is required in the coil 26 to move the spool valve 50. This biases the operation of the device 10 above low currents and, subsequently, above the low force levels associated with low currents. Adjustment of the second end cap 37 can be used to set the control pressure in the second end 58 of the spool valve 50 for a predetermined current level. The adjustment means 74 can also be used to adjust the poppet valve area and, therefore, the internal pressure for a given gap 21 between the armature ring 20 and the stationary member 12.

An alternate embodiment of the subject invention is generally shown at 100 in FIG. 2. Like parts of the preferred embodiment have like numerals increased by 100 (one hundred). The alternate embodiment 100 is similar in construction to the preferred embodiment 10. In the device 100, the stationary member 112 and armature means 118 have axial positions reversed from those of the preferred embodiment 10. The armature means 118 of the device 100 comprises an armature ring 120 having a central passageway 174 communicating therethrough and an annular shoulder 175 adjacent the face of the poppet plate 166 to open and close the poppet aperture 168. A guiding means 176 comprising a shaft 176 is disposed in the passageway 174 and connected to the armature ring 120 and has one end slidably disposed in the central passageway 116 of the stationary member 112 and the other end slidably disposed in the poppet aperture 168. The guiding means 176 guides axially the armature means 118 between the stationary member 112 and the poppet valve means 166. A closure member 178 is disposed about one end of the shaft 176 and within the central passage 116 of the stationary member 112. A third biasing means 180 comprising a spring 180 is disposed between the adjustment means 174 and the closure member 178 for biasing the armature means 118 toward the poppet plate 166 to close the poppet aperture 168. The third biasing means 180 biases the armature ring 120 toward the poppet plate 166 to keep the control pressure at a high value when no current is flowing to the magnetic coil 126.

In operation, the magnetic coil 126 receives electrical current from a power source through the connectors 134. The solenoid coil 126 creates a magnetic force between the armature ring 120 and the stationary member 112 to move the armature ring 120 toward the stationary member 112. Fluid from a supply source flows through the first aperture 144 and through the first internal passage 156 to the first end 152 of the spool valve 150. As the pressure increases at the first end 152 of the spool valve 150, the spool valve 150 will move axially away from the poppet plate 166. The first internal passage 156 and third aperture 148 will then be closed off and fluid will flow from the first aperture 144 through the recessed portion 162 to the second aperture 146. Further, fluid will flow through the second internal passage 164 to the second end 158 of the spool valve 150.

As illustrated in FIG. 3, an alternate embodiment of the stationary member and armature ring is generally shown at 200. Like parts of the preferred embodiment have like numerals increased by 200 (two hundred). The stationary member 212 has a cylindrical or non-conical end 282. Across the working gap 221 from the non-conical end 282 of the stationary member 212, the armature ring 220 has a cylindrical or second non-conical end 284. As the distance between the non-conical ends 282,284 or working gap 221 increases, the attractive force between the stationary member 212 and the armature ring 220 drops off or decreases quickly as compared to complimentary tapered ends of the preferred embodiment.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A pressure regulating device for regulating the pressure of a flowing fluid medium, said device comprising: a stationary member, a movable armature means disposed axially from said stationary member for moving axially in relation to said stationary member, coil means disposed about said stationary member and said armature means and through which current flows for generating magnetic flux to create an attractive force to move said armature means in relation to said stationary member, housing means disposed about said coil means and said stationary member and said armature means for encasing said armature means and said coil means and said stationary member, aperture means for forming at least one aperture in said housing means to allow a fluid medium to enter and exit said housing means and to contact said armature means, flow valve means having first and second axially spaced ends being of a single diameter and one of said pair of ends being spaced axially from one end of said armature means for moving independently of said armature means to prevent parasitic forces from being transmitted by said flow valve means to said armature means; poppet valve means disposed axially between said flow valve means and said armature means for creating a restriction of fluid flow to said armature means; and biasing means disposed axially between said poppet valve means and said flow valve means for biasing said flow valve means axially away from said armature means to reduce oscillations between said armature means and said flow valve means.

2. A device as set forth in claim 1 including second biasing means for continuously biasing said flow valve means toward said poppet valve means.

3. A device as set forth in claim 2 including a working gap axially disposed between said stationary member and said armature means through which magnetic flux flows to create an attractive force between said stationary member and said armature means.

4. A device as set forth in claim 3 including adjustment means disposed axially at one end of said armature means for controlling the axial location of said armature means in relation to said poppet valve means.

5. A device as set forth in claim 4 characterized by said poppet valve means comprising a poppet plate having a poppet aperture through which the fluid medium flows.

6. A device as set forth in claim 5 characterized by said second biasing means having a preload less than said first biasing means.

7. A device as set forth in claim 6 characterized by said aperture means including a first aperture formed in said housing means to allow the fluid medium to enter and exit said housing means.

8. A device as set forth in claim 7 further characterized by said aperture means including a second aperture formed in said housing means to allow the fluid medium to enter and exit said housing means.

9. A device as set forth in claim 8 further characterized by said aperture means including a third aperture formed in said housing means to allow the fluid medium to enter and exit said housing means, said second aperture being disposed axially between said first aperture and said third aperture and spaced axially therefrom.

10. A device as set forth in claim 9 further characterized by said flow valve means comprising a spool valve having a first internal passage to allow the fluid medium to flow from said first aperture to said poppet valve means.

11. A device as set forth in claim 10 further characterized by said spool valve having said first end spaced axially from said poppet valve means and a first cavity formed therein.

12. A device as set forth in claim 11 characterized by said spool valve having said second end axially opposite said first end and a second cavity formed therein.

13. A pressure regulating device for regulating the pressure of a flowing fluid medium, said device comprising; a stationary member, a movable armature means disposed axially from said stationary member for moving axially in relation to said stationary member, coil means disposed about said stationary member and said armature means and through which current flows for generating magnetic flux to create an attractive force to move said armature means in relation to said stationary member, housing means disposed about said coil means and said stationary member and said armature means for encasing said armature means and said coil means and said stationary member, aperture means for forming at least one aperture in said housing means to allow a fluid medium to enter and exit said housing means and to contact said armature means, and flow valve means spaced axially from one end of said armature means for moving independently of said armature means to prevent parasitic forces from being transmitted by said flow valve means to said armature means;

poppet valve means disposed axially between said flow valve means and said armature means for creating a restriction of fluid flow to said armature means;

first biasing means for continuously biasing said flow valve means toward said poppet valve means;

a working gap axially disposed between said stationary member and said armature means through which magnetic flux flows to create an attractive force between said stationary member and said armature means;

adjustment means disposed axially at one end of said armature means for controlling the axial location of said armature means in relation to said poppet valve means;

said poppet valve means comprising a poppet plate having a poppet aperture through which the fluid medium flows;

a second biasing means disposed axially between said poppet valve means and said flow valve means for biasing said flow valve means axially away from said armature means to reduce oscillations between said armature means and said flow valve means;

said second biasing means having a preload less than said first biasing means;

said aperture means including a first aperture formed in said housing means to allow the fluid medium to enter and exit said housing means;

said aperture means including a second aperture formed in said housing means to allow the fluid medium to enter and exit said housing means;

said aperture means including a third aperture formed in said housing means to allow the fluid medium to enter and exit said housing means, said second aperture being disposed axially between said first aperture and said third aperture and spaced axially therefrom;

said flow valve means comprising a spool valve having a first internal passage to allow the fluid medium to flow from said first aperture to said poppet valve means;

said spool valve having a first end spaced axially from said poppet valve means and a first cavity formed therein;

said spool valve having a second end axially opposite said first end and a second cavity formed therein; and said spool valve including a second internal passage to allow the fluid medium to flow from either of said first aperture and said second aperture and said third aperture to said second cavity of said spool valve.

14. A device as set forth in claim 13 further characterized by said housing means including an end cap in one end thereof opposite said armature means.

15. A device as set forth in claim 14 further characterized by said first biasing means comprising a spring disposed between said end cap and said spool valve.

16. A device as set forth in claim 15 further characterized by said second biasing means comprising a spring disposed between said first end of said spool valve and said poppet plate.

17. A device as set forth in claim 16 further characterized by said spool valve having a recessed portion about the circumference thereof between said ends of said spool valve.

18. A device as set forth in claim 17 further characterized by said coil means comprising a magnetic coil to generate magnetic flux.

19. A device as set forth in claim 18 including connectors connected to said coil for attachment to an electrical power source to allow electrical current to flow to said coil.

20. A device as set forth in claim 19 including a return member disposed adjacent one end of said coil means to create a closed flux loop by allowing magnetic flux to flow from said coil means to said stationary member and said armature means across said working gap and through said return member to said coil means.

21. A device as set forth in claim 20 characterized by said armature means comprising an armature shaft slidably disposed in a central passage in said stationary member and an armature ring disposed about said armature shaft and cooperating with said magnetic coil.

22. A device as set forth in claim 21 further characterized by said adjustment means comprising a threaded fastener at one end of said armature shaft and threadably engageable with said armature ring.

23. A device as set forth in claim 20 including a guiding means for guiding axially said armature means between said stationary member and said poppet valve means.

24. A device as set forth in claim 23 characterized by said guiding means comprising a shaft connected to said armature means having one end slidably disposed in said stationary member and the other end slidably disposed in said poppet aperture.

25. A device as set forth in claim 24 further characterized by said armature means having an annular shoulder at one end thereof to open and close said poppet aperture.

26. A device as set forth in claim 25 including a third biasing means for biasing said armature means toward said poppet plate to close said poppet aperture.

27. A device as set forth in claim 26 characterized by said adjustment means comprising a fastener threadably engageable with said stationary member.

28. A device as set forth in claim 27 characterized by said third biasing means comprising a spring disposed between one end of said shaft and said fastener.

29. A pressure regulating device for regulating the pressure of a flowing fluid medium, said device comprising; a stationary member, a movable armature means disposed axially from said stationary member for moving axially in relation to said stationary member, coil means disposed about said stationary member and said armature means and through which current flows for generating magnetic flux to create an attractive force to move said armature means in relation to said stationary member, housing means disposed about said coil means and said stationary member and said armature means for encasing said armature means and said coil means and said stationary member, aperture means forming at least one aperture in said housing means to allow a fluid medium to enter and exit said housing means and to contact said armature means, flow valve means spaced axially from one end of said armature means for moving independently of said armature means to prevent parasitic forces from being transmitted by said flow valve means to said armature means, poppet valve means disposed axially between said flow valve means and said armature means for creating a restriction of fluid flow to said armature means, first biasing means for continuously biasing said flow valve means toward said poppet valve means, a working gap disposed axially between said stationary member and said armature means through which magnetic flux flows to create an attractive force between said stationary member and said armature means, said poppet valve means comprising a poppet plate having a poppet aperture through which the fluid medium flows, adjustment means disposed axially at one end of said armature means for controlling the axial location of said armature means in relation to the axial location of said poppet plate, a second biasing means disposed axially between said poppet valve means and said flow valve means for biasing said flow valve means axially away from said armature means to reduce oscillations between said armature means and said flow valve means, said second biasing means having a preload less than said first biasing means, said aperture means including a first aperture formed in said housing means to allow the fluid medium to enter and exit said housing means, a second aperture formed in said housing means to allow the fluid medium to enter and exit said housing means, said aperture means including a third aperture formed in said housing means to allow the fluid medium to enter and exit said housing means, said second aperture being disposed axially between said first aperture and said third aperture and spaced axially therefrom, said flow valve means comprising a spool valve having a first internal passage to allow the fluid medium to flow from said first aperture to said poppet valve means, said spool valve having a first end spaced axially from said poppet valve means and a first cavity formed therein, said spool valve having a second end axially opposite said first end and a second cavity formed therein, said spool valve including a second internal passage to allow the fluid medium to flow from either one of said first and second and third apertures to said second cavity of said spool valve, said spool valve including a recessed portion about the circumference thereof between said ends of said spool valve, said housing means including an end cap in one end thereof opposite said armature means, said first biasing means comprising a first spring disposed between said end cap and said spool valve, said second biasing means comprising a second spring disposed between said first end of said spool valve and said poppet plate, said coil means comprising a magnetic coil to generate magnetic flux, connectors connected to said coil to allow current from an electrical power source to flow to said magnetic coil, a return member disposed adjacent one end of said coil means to create a closed flux loop by allowing magnetic flux to flow from said coil means to said stationary member and said armature means and across said working gap and through said return member to said coil means, said armature means comprising an armature shaft slidably disposed in a central passage in said stationary member and an armature ring disposed about said armature shaft and cooperating with said magnetic coil, said adjustment means comprising a threaded fastener at one end of said armature shaft and threadably engageable with said armature ring.

30. A device as set forth in claim 29 characterized by one end of said armature ring having a conical cavity portion and the adjacent end of said stationary member having a conical portion complimentary to said conical cavity of said armature ring.

31. A device as set forth in claim 30 characterized by one end of said armature ring being non-conical and the adjacent end of said stationary member being non-conical.

32. A pressure regulating device for regulating the pressure of a flowing fluid medium, said device comprising; a stationary member, a movable armature means disposed axially from said stationary member for moving axially in relation to said stationary member, coil means disposed about said stationary member and said armature means and through which current flows for generating magnetic flux to create an attractive force to move said armature means in relation to said stationary member, housing means disposed about said coil means and said stationary member and said armature means for encasing said armature means and said coil means and said stationary member, aperture means forming at least one aperture in said housing means to allow a fluid medium to enter and exit said housing means and to contact said armature means, flow valve means spaced axially from one end of said armature means for moving independently of said armature means to prevent parasitic forces from being transmitted by said flow valve means to said armature means, poppet valve means disposed axially between said flow valve means and said armature means for creating a restriction of fluid flow to said armature means, first biasing means for continuously biasing said flow valve means toward said poppet valve means, a working gap disposed axially between said stationary member and said armature means through which magnetic flux flows to create an attractive force between said stationary member and said armature means, said poppet valve means comprising a poppet plate having a poppet aperture through which the fluid medium flows, adjustment means disposed axially at one end of said armature means for controlling the axial location of said armature means in relation to the axial location of said poppet plate, a second biasing means disposed axially between said poppet valve means and said flow valve means for biasing said flow valve means axially away from said armature means to reduce oscillations between said armature means and said flow valve means, said second biasing means having a preload less than said first biasing means, said aperture means including a first aperture formed in said housing means to allow the fluid medium to enter and exit said housing means, a second aperture formed in said housing means to allow the fluid medium to enter and exit said housing means, said aperture means including a third aperture formed in said housing means to allow the fluid medium to enter and exit said housing means, said second aperture being disposed axially between said first aperture and said third aperture and spaced axially therefrom, said flow valve means comprising a spool valve having a first internal passage to allow the fluid medium to flow from said first aperture to said poppet valve means, said spool valve having a first end spaced axially from said poppet valve means and a first cavity formed therein, said spool valve having a second end axially opposite said first end and a second cavity formed therein, said spool valve including a second internal passage to allow the fluid medium to flow from either one of said first and second and third apertures to said second cavity of said spool valve, said housing means including an end cap in one end thereof opposite said armature means, said first biasing means comprising a first spring disposed between said end cap and said spool valve, said second biasing means comprising a second spring disposed between said first end of said spool valve and said poppet plate, said coil means comprising a magnetic coil to generate magnetic flux, connectors connected to said coil means for attachment to an electrical power source to allow current from an electrical power source to flow to said magnetic coil, a return member disposed adjacent one end of said coil means to create a closed flux loop by allowing magnetic flux to flow from said coil means through said return member and across said working gap to said armature means and said stationary member to said coil means, a guiding means for guiding axially said armature means between said stationary member and said poppet valve means, said guiding means comprising a shaft connected to said armature means and having one end slidably disposed in said stationary member and the other end slidably disposed in said poppet aperture, said armature means comprising an armature ring disposed about said shaft and having an annular shoulder at one end opposite said stationary member to open and close said poppet aperture, a third biasing means for biasing said armature means toward said poppet plate to close said poppet aperture, said adjustment means comprising a fastener threadably engageable with said stationary member, said third biasing means comprising a third spring disposed between one end of said shaft and said fastener.

33. A device sa set forth in claim 32 characterized by one end of said armature ring having a conical cavity portion and the adjacent end of said stationary member having a conical portion complimentary to said conical cavity of said armature ring.

34. A device as set forth in claim 32 characterized by one end of said armature ring being non-conical and the adjacent end of said stationary member being nonconical.

35. A pressure regulating device for regulating the pressure of a flowing fluid medium, said device comprising; a stationary member, a movable armature means disposed axially from said stationary member for moving axially in relation to said stationary member, coil means disposed about said stationary member and said armature means and through which current flows for generating magnetic flux to create an attractive force to move said armature means in relation to said stationary member, housing means disposed about said coil means and said stationary member and said armature means for encasing said armature means and said coil means and said stationary member, aperture means for forming at least one aperture in said housing means to allow a fluid medium to enter and exit said housing means and to contact said armature means, and flow valve means spaced axially from one end of said armature means for moving independently of said armature means to prevent parasitic forces from being transmitted by said flow valve means to said armature means.;

poppet valve means disposed axially between said flow valve means and said armature means for creating a restriction of fluid flow to said armature means;

first biasing means for continuously biasing said flow valve means toward said poppet valve means;

a working gap axially disposed between said stationary member and said armature means through which magnetic flux flows to create an attractive force between said stationary member and said armature means;

said poppet valve means comprising a poppet plate having a poppet aperture through which the fluid medium flows;

said aperture means including a first aperture formed in said housing means to allow the fluid medium to enter and exit said housing means;

said aperture means including a second aperture formed in said housing means to allow the fluid medium to enter and exit said housing means;

said aperture means including a third aperture formed in said housing means to allow the fluid medium to enter and exit said housing means, said second aperture being disposed axially between said first aperture and said third aperture and spaced axially therefrom;

said flow valve means comprising a spool valve having a first internal passage to allow the fluid medium to flow from said first aperture to said poppet valve means;

said spool valve having a first end spaced axially from said poppet valve means and a first cavity formed therein;

said spool valve having a second end axially opposite said first end and a second cavity formed therein; and said spool valve including a second internal passage to allow the fluid medium to flow from either of said first aperture and said second aperture and said third aperture to said second cavity of said spool valve.

36. A pressure regulating device for regulating the pressure of a flowing fluid medium, said device comprising; a stationary member, a movable armature means disposed axially from said stationary member for moving axially in relation to said stationary member, coil means disposed about said stationary member and said armature means and through which current flows for generating magnetic flux to create an attractive force to move said armature means in relation to said stationary member, housing means disposed about said coil means and said stationary member and said armature means for encasing said armature means and said coil means and said stationary member, aperture means for forming at least one aperture in said housing means to allow a fluid medium to enter and exit said housing means and to contact said armature means, and flow valve means spaced axially from one end of said armature means for moving independently of said armature means to prevent parasitic forces from being transmitted by said flow valve means to said armature means;

poppet valve means disposed axially between said flow valve means and said armature means for creating a restriction of fluid flow to said armature means;

first biasing means for continuously biasing said flow valve means toward said poppet valve means;

a working gap axially disposed between said stationary member and said armature means through which magnetic flux flows to create an attractive force between said stationary member and said armature means;

said poppet valve means comprising a poppet plate having a poppet aperture through which the fluid medium flows;

said aperture means including a first aperture formed in said housing means to allow the fluid medium to enter and exit said housing means;

said aperture means including a second aperture formed in said housing means to allow the fluid medium to enter and exit said housing means;

said aperture means including a third aperture formed in said housing means to allow the fluid medium to enter and exit said housing means, said second aperture being disposed axially between said first aperture and said third aperture and spaced axially therefrom;

said flow valve means comprising a spool valve having a first internal passage to allow the fluid medium to flow from said first aperture to said poppet valve means;

said spool valve having a first end spaced axially from said poppet valve means and a first cavity formed therein;

said spool valve having a second end axially opposite said first end and a second cavity formed therein;

said spool valve including a second internal passage to allow the fluid medium to flow from either of said first aperture and said second aperture and said third aperture to said second cavity of said spool valve;

said housing means including an end cap in one end thereof opposite said armature means;

said first biasing means comprising a spring disposed between said end cap and said spool valve;

said spool valve having a recessed portion about the circumference thereof between said ends of said spool valve;

said coil means comprising a magnetic coil to generate magnetic flux;

connectors connected to said coil for attachment to an electrical power source to allow electrical current to flow to said coil;

a return member disposed adjacent one end of said coil means to create a closed flux loop by allowing magnetic flux to flow from said coil means to said stationary member and said armature means across said working gap and through said return member to said coil means;

said armature means comprising a cylindrical shape having a surface at one end opposite said stationary member to open and close said poppet aperture; and a second biasing means for biasing said armature means toward said poppet plate to close said poppet aperture.

37. A device as set forth in claim 36 including adjustment means disposed axially at one end of said armature means for controlling the axial location of said armature means in relation to said poppet valve means.

38. A device as set forth in claim 36 wherein said second biasing means comprises a second spring disposed inside a pocket formed in said stationary member.

39. A device as set forth in claim 36 wherein said second biasing means comprises a second spring disposed inside a pocket formed in said armature means.

40. A device as set forth in claim 36 including a third biasing means disposed axially between said poppet valve means and said flow valve means for biasing said flow valve means axially away from said armature means to reduce oscillations between said armature means and said flow valve means.

41. A device as set forth in claim 40 characterized by said third biasing means having a preload less than said first biasing means.

42. A device as set forth in claim 40 further characterized by said third biasing means comprising a third spring disposed between said first end of said spool valve and said poppet plate.

43. A device as set forth in claim 36 characterized by a guiding means for guiding axially said armature means between said stationary member and said poppet valve means, said guiding means comprising a shaft connected to said armature means having one end slidably disposed in said stationary member and the other end slidably disposed in said poppet aperture.

44. A device as set forth in claim 37 characterized by said adjustment means comprising a fastener threadably engageable with said stationary member.

* * * * *